United States Patent [19]

Venkataramanan

[11] Patent Number: 5,570,279
[45] Date of Patent: Oct. 29, 1996

[54] PWM CONVERTERS FOR THREE PHASE AC POWER CONTROL AND AC TO DC CONVERSION

[75] Inventor: Giri Venkataramanan, Bozeman, Mont.

[73] Assignee: The Research and Development Institute, Inc. at Montana State University, Bozeman, Mont.

[21] Appl. No.: 309,356

[22] Filed: Sep. 21, 1994

[51] Int. Cl.⁶ .......................... H02M 7/217; H02M 5/45
[52] U.S. Cl. ............................. 363/127; 363/37
[58] Field of Search ................... 363/34, 36, 37, 363/123, 125, 127, 132, 95, 97

[56] References Cited

U.S. PATENT DOCUMENTS

| | | | |
|---|---|---|---|
| 4,521,671 | 6/1985 | Fronius | 219/130.31 |
| 4,697,230 | 9/1987 | Neft | 363/136 |
| 4,894,763 | 1/1990 | Ngo | 363/35 |
| 4,947,308 | 8/1990 | Gulczynski | 363/37 |
| 5,017,800 | 5/1991 | Divan | 363/37 |
| 5,099,410 | 3/1992 | Divan | 363/132 |

Primary Examiner—Matthew V. Nguyen

[57] ABSTRACT

PWM converters provide buck, boost, buck-boost, flyback, and Cuk configurations for three phase AC-AC power control. In an AC-DC embodiment, only a single power conversion circuit is used in a configuration including a pair of series connected gate turn off devices which are oppositely poled and oppositely timed, are connected directly to an AC input source, and provide an output to a high frequency isolating transformer. The transformer provides an output to a rectifier, which thus provides the DC output.

15 Claims, 10 Drawing Sheets

FIG. 8(a) BOOST CONVERTER

FIG. 8(b) BUCK BOOST CONVERTER

FIG. 8(c) FLYBACK CONVERTER

FIG. 8(d) CUK CONVERTER

FIG. 8(e) ISOLATED CUK CONVERTER

GALVANIC ISOLATION

PWM CONVERTERS FOR THREE PHASE AC POWER CONTROL AND AC TO DC CONVERSION

TECHNICAL FIELD

This invention relates generally to power converters, and more particularly to power converters utilizing pulse width modulation for chopping an input AC signal. Still more particularly, the invention relates to power conversion circuits providing high power factor, bidirectional AC operation with sinusoidal input and output voltages, and step up and step down voltage control, for unity power factor AC-DC conversion wherein DC conversion is provided subsequently to chopping and for three-phase AC-AC conversion.

BACKGROUND ART

In a number of applications of electric power, it is desirable to step down or step up utility ac voltage in order to facilitate effective use of the available power. Such applications include, for example, lamp dimmers and resistive heater controllers. Use of transformers for realizing voltage step-up and/or step-down has been a well known and widespread technology. Transformers may be of an isolated type or of an autotransformer type. However, a drawback associated with the uses of transformers is the large size resulting form large amounts of copper and iron. Further, in order to maintain regulation under varying loads and line voltages, mechanical or thyristor tap changing switches are generally used. In certain cases, the brush contacts of the autotransformer may be motor driven to maintain regulation. However, the performance of such controllers is extremely poor in terms of speed and reliability. In addition, they require extensive periodic maintenance.

Over the past few decades, the use of Silicon Controlled Rectifier (SCR) and triacs has miniaturized the above noted functions through the use of solid state technology. Indeed, the use of SCR and triac ac voltage controllers is widespread in home lamp dimmers and industrial heaters. In such devices, control is exercised by means of variation of a firing angle, which offers smooth and fast response over a wide range. As is known in the art, these devices are generally limited to step down of voltage.

While SCRs and triacs perform the function satisfactorily, they introduce a large amount of harmonics into the utility power lines, as well as to the load, and result in poor power quality. The input power factor also varies widely with the operating range. These power quality problems are compounding as the use of such devices are proliferating in home and industry. Due to their poor waveform quality, they have been primarily used in applications such as heating, where quality does not affect normal operation.

Figure 1:
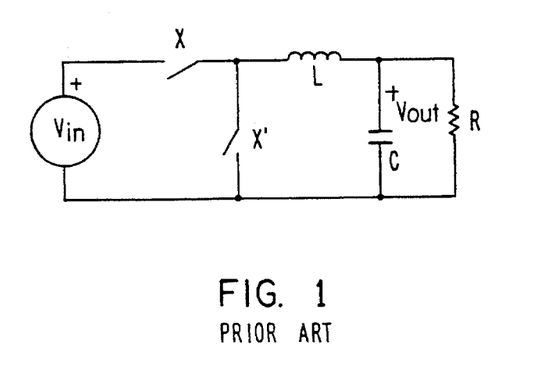
FIG. 1 shows a prior art single input phase, single output phase, AC-AC buck converter.

The use of Pulse Width Modulation (PWM) to realize dc-dc power conversion applications is wide spread and well-understood, and thus is not described herein. Moreover, various techniques for realizing single phase ac to single phase ac power control using PWM have been presented in the past. A known single input phase, single output phase, buck converter configuration using ideal switches is illustrated in FIG. 1. Such a configuration is described in FIG. 3 of U.S. Pat. No. 4,347,474, for example. The operation of the circuit is well known and understood. In this configuration, switches X and X' are turned on and off in a complementary manner at a high rate. The output voltage is related to the input voltage through the duty ratio, which is given by the percentage of time that a switch X is conductive ("ON") during the total switching period.

In summary, three phase and single phase ac power conditioning have been realized using tap-changing/autotransformers and thyristor phase control. However, these devices are bulky, slow, and/or suffer from poor waveform quality. With growing concerns of power quality prompted by widespread application of sensitive loads, there is thus a need in the prior art for a new generation of high performance power converters for three phase ac power conditioning, and to realize high performance ac voltage/power control, as well as for efficient circuit structures for AC to DC power conversion.

Moreover, with the prospect of large scale introduction of electric vehicles, there is need for means for transfer of DC power to a vehicle from AC utility sources. In order to maximize the power drawn from the utility, unity power factor operation is highly desirable, as is high frequency operation which results in reduction in the size of transformers used in such a converter.

Known AC-DC converters include SCR configurations, wherein galvanic isolation is effected through the use of a conventional bulky low frequency transformer. Charge rate control is effected through variation of the firing angle of an SCR bridge. Such configurations generally have a low operating power factor. In diode rectifier converters using such transformers, charge rate control is effected through variation of the duty ratio of the converter, resulting in extremely poor power factor. When a high frequency transformer is used in conjunction with a diode rectifier, power factor is improved, but the input current is still rich in harmonics.

Figure 2A:
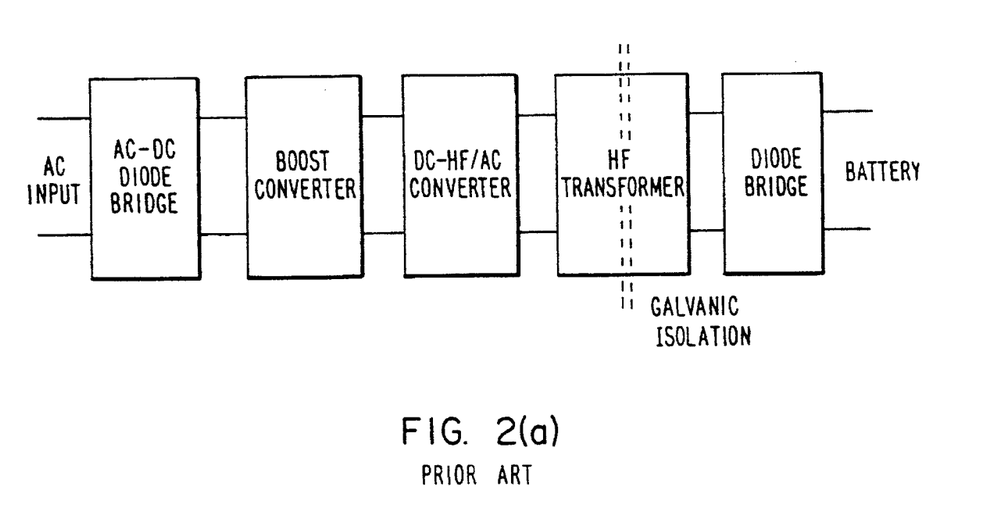
FIG. 2(a) shows a schematic configuration of a prior art isolated AC-DC converter.
Figure 2B:
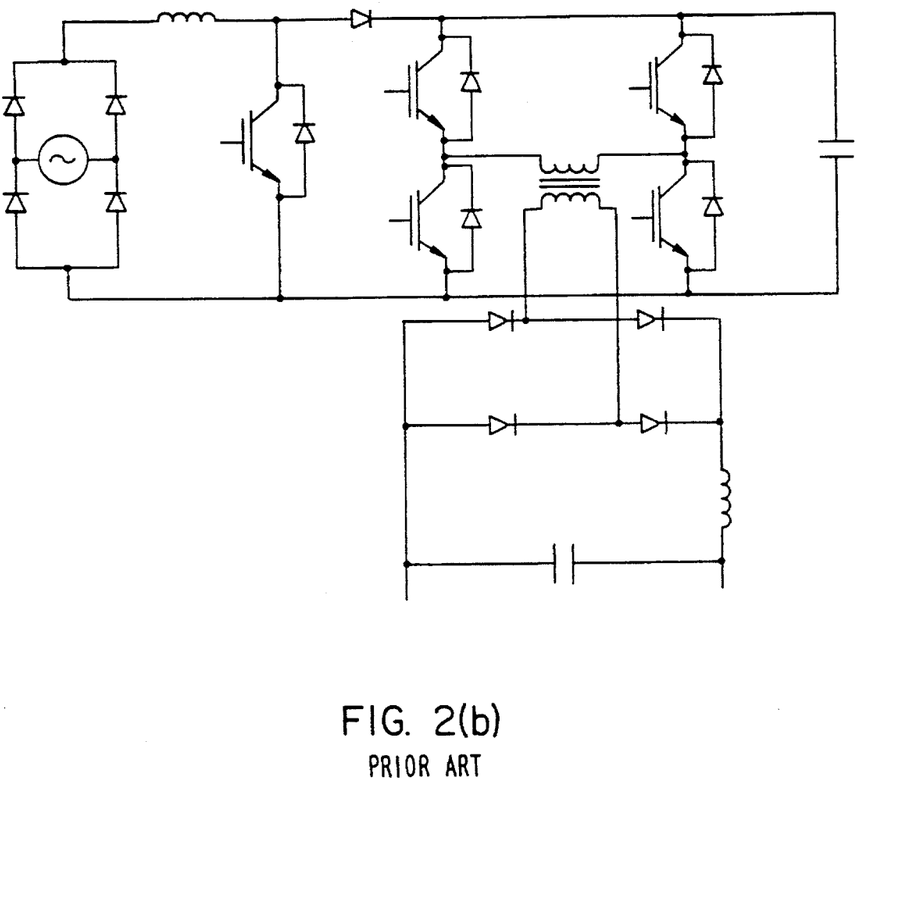
FIG. 2(b) shows details of the prior art of FIG. 2(a)

In a known boost rectifier configuration of an isolated DC-DC converter, shown schematically in FIG. 2(a), a unity power factor interface is provided to a single phase utility using a boost converter feeding into an intermediate DC bus. The DC bus voltage is subsequently chopped into high frequency AC using resonant or other means, and is passed through a clamp-on or a co-axial type of power transformer, as shown in greater detail in FIG. 2(b). The secondary side of the power transformer contains a rectifier feeding to the load, such as a battery being charged. To achieve high power density of the system, high frequency isolation at the transformer is imperative.

While such an approach fulfills the various power requirements, drawbacks include the requirement for five distinct stages of power transfer in the forward path, shown schematically in FIG. 2(a), each contributing conduction losses and thus reducing the system efficiency. A bulky intermediate DC bus is required to filter out 120 Hz power fluctuations caused by the single phase AC input. Moreover, two controlled power stages are required. To prevent DC voltage overshoots, power balance between input and output stages has to be coordinated, resulting in increased complexity in the control strategy.

There is thus a need in the prior art for highly efficient, unity power factor, AC-DC converters, using a reduced number of stages of power conversion.

There is a more specific need to provide a simplified AC-DC power converter, using only a single power converting stage and a minimum number of components.

DISCLOSURE OF INVENTION

It is accordingly an object of the present invention to provide improved methods and apparatus for three phase AC-AC power conversion and for AC-DC power conversion.

It is a particular object of the invention to provide high performance power converters for three phase AC power conditioning, and to realize high performance AC voltage/ power control.

It is a specific object of the invention to provide highly efficient, unity power factor, AC-DC converters, using a reduced number of stages of power conversion.

It is still another object of the invention to provide a simplified AC-DC power converter, using only a single power converting stage and a minimum number of components.

It is a more particular object of the invention to provide an AC-DC converter using a pair of oppositely timed, oppositely poled, PWM switches across an AC input, together with a HF transformer coupled to an output diode bridge.

Yet another object of the invention is to provide three phase AC-AC power control, using a bidirectional current, unidirectional voltage, DC-DC converter between each phase of an input voltage source and a corresponding load.

A more specific object of the invention is to provide a three phase AC-AC power control device, including switched devices cooperating for each phase of an input AC power source, for providing filtered AC output power to a three phase load.

It is a particular object of the invention to provide such an AC-AC power control device structured to provide buck, boost, and buck-boost operation, with or without transformer isolation.

It is a more general object of the present invention to provide a family of three phase power converters for AC active and reactive power control with high performance capabilities to meet the requirements of high power quality using pulse width modulation techniques.

It is another object of the invention to provide a family of power converters which represent a functional equivalent for a transformer/autotransformer, featuring fast control, sinusoidal input and output voltages, bidirectional operation and high frequency isolation capability.

In accordance with one aspect of the invention, there is thus provided a power conversion circuit, for converting AC to DC power, having an AC-HF AC converter connected to an AC input, a HF transformer, and a rectifying circuit for providing DC output.

Preferably, such a power conversion circuit includes a pair of oppositely timed, oppositely poled, pulse width modulated switches across an AC input, together with a HF transformer coupled to an output rectifying circuit in the form of a diode bridge.

The PWM switches and a primary of the HF transformer may be connected in series across the AC input, providing a buck-boost converter.

Alternatively, the PWM switches may be provided across a series combination of the AC input and an inductor, and the primary winding of the HF transformer may be in series connection with a filter capacitor, the combination being coupled across the pair of PWM switches, in a Cuk configuration.

In accordance with another aspect of the invention, there is provided a three phase AC-AC power control, using a bidirectional current, unidirectional voltage, converter between each phase of an input voltage source and a corresponding load.

Preferably, such a power control includes switched devices cooperating for each phase of an input AC power source, for providing filtered AC output power to a three phase load.

Still more particularly, in accordance with the invention there are provided three phase AC-AC power control devices structured to provide buck, boost, and buck-boost operation, with or without transformer isolation.

The invention thus provides a family of three phase power converters for ac power control with high performance capabilities, to meet the requirements of high power quality using pulse width modulation techniques.

The invention more particularly provides a family of power converters which represent a functional equivalent for a transformer/autotransformer, featuring fast control, sinusoidal input and output voltages, bidirectional operation and high frequency isolation capability.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWING

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

The present invention provides a novel and unobvious improvement in power control, using PWM techniques for three phase AC conversion, to provide functional equivalents for transformers with both step down and step up capability, at a high power density and with an easy and fast electronic controllability. The development of the inventive topologies along with a brief discussion of associated design issues is described below. Simulation and experimental results verifying the operation of the inventive converters is also presented.

Figure 3:
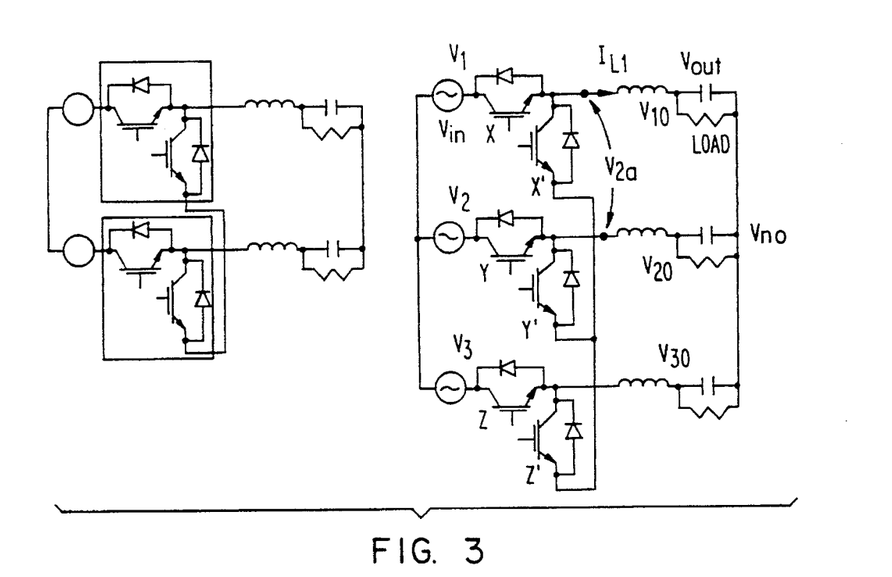
FIG. 3 shows a three phase ac buck converter in accordance with the invention.

Referring now to the drawings, there is shown in FIG. 3 a three phase ac buck converter in accordance with the invention, using pairs of complementarily conducting switches X–X', Y–Y' and Z–Z' to provide output voltages across Y-connected load resistors relative to the neutral voltage Vno, and including low pass filters (including inductance L and capacitance C) at the output. Each of the switches is a gate turn off device with an anti parallel diode, which may be turned on or off at will by application of an appropriate gate voltage or current thereto. For example, the switches may be implemented using MOSFETs (metal-oxide-semiconductor-field-effect-transistors), IGBTs (insulated-gate-bipolar-transistors), MCTs (MOS-controlled-thyristors), GTCs (gate-turnoff-thyristors) or the like.

A criterion for use of such a device in the inventive circuit is its capability (when in an OFF, or blocking, state) to block at least the input voltage or the output voltage (peak line-line value), whichever is greater, in the case of buck, boost, and buck-boost converters, and to block the sum of the input and output voltages in CUK converters. Moreover, such a device should be capable (in its ON, or conducting, state) of carrying the input current (peak) and output current, whichever is greater, in the case of buck or boost converters, and the sum of input and output currents in the case of buck-boost and CUK converters.

Figure 4A:
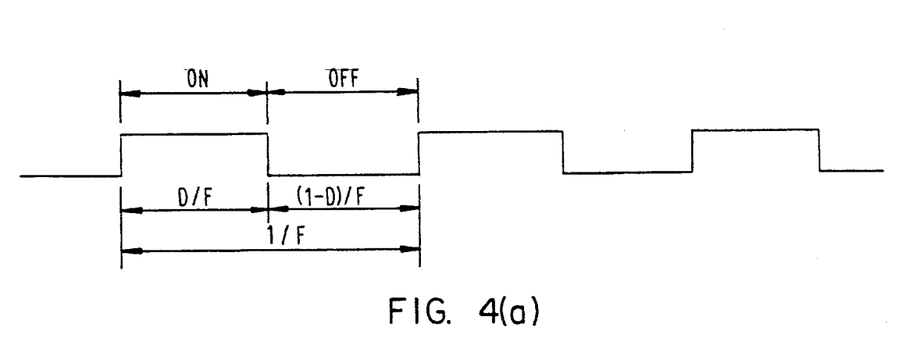
FIGS. 4(a) and 4(b) show driving waveforms for the device of FIG. 3.
Figure 4B:
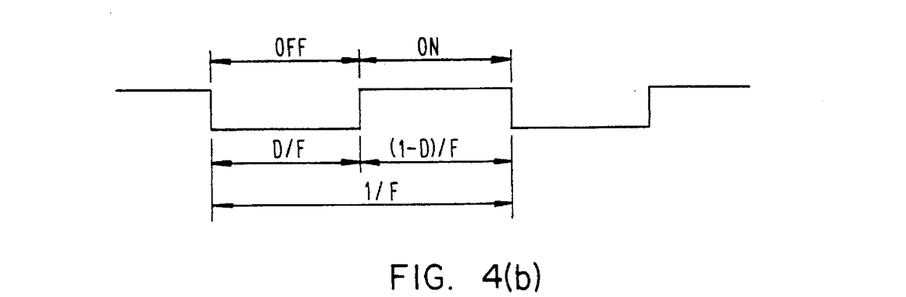

In the illustrated configuration, switches X, Y and Z are driven by gate pulse waveforms, which may be rectangular, as shown in FIG. 4(a), in order to be turned ON and OFF sequentially, in a repetitive manner at a frequency F. Switches X', Y' and Z' are driven by complementary waveforms, as shown in FIG. 4(b). In the waveform of FIG. 4(a), D is defined as the duty ratio for the given converter. The frequency F is the switching, or chopping frequency. This frequency is an important design parameter, which determines the value of the inductors and capacitors used in the circuits.

The value of L and C, the filter elements of the embodiment of FIG. 3, dictate the value of the $\Delta I$ and $\Delta V_o$, the ripple in the inductor current and the output voltage. They may be determined using well-known expressions available in the literature. For instance, in a buck converter, $$\frac{\Delta V_o}{V_p} = \frac{(1-d)}{SLCF^2}$$

$$\frac{\Delta I_L}{I_P} = \frac{(1-d)L}{LF}$$

Figure 5:
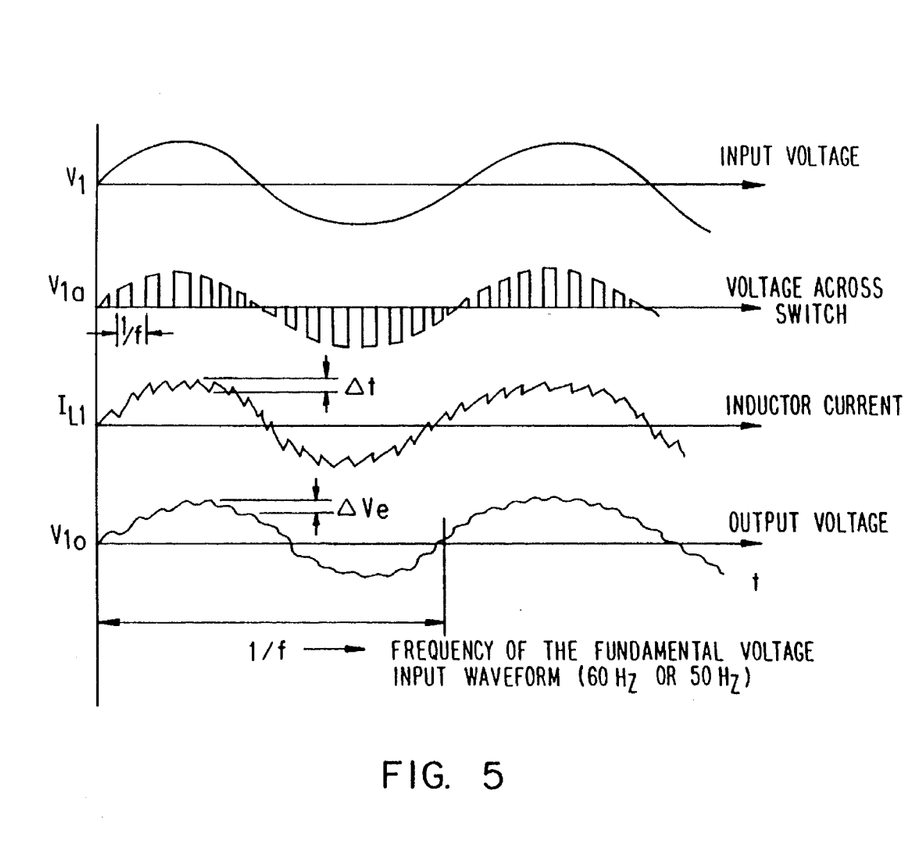
FIG. 5 shows various waveforms useful in understanding operating of the inventive concept.

The chopping frequency is dictated by the maximum repetition rate at which the switches can be operated. A given switching device (such as a MOSFET) has a maximum switching frequency at which it can operate, depending on the power levels being switched. Operation of the inventive concept in the buck converter of FIG. 3 may be understood upon reference to the waveforms of FIG. 5, showing the input voltage V1, the voltage V1a appearing across a switch when subjected to a control voltage switching at the chopping frequency, the inductor current IL1, and the output voltage V1o across the load relative to the neutral voltage.

The chopping frequency F is selected to be greater than the fundamental frequency f of the utility input waveform, typically 50 or 60 Hz. The frequency F is typically greater than several kHz.

Figure 6:
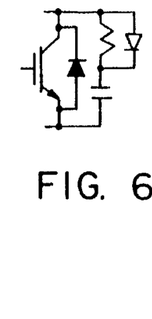
FIG. 6 shows a snubber circuit to be used in conjunction with the invention.

Further, there needs to be added a snubber circuit across each switching device X, Y, Z, X', Y', Z', as shown in FIG. 6, to ensure a path of current flow during switching transients. Design of the snubber circuits is described in greater detail hereinbelow.

The switches used in the embodiment of FIG. 3 are operated under a PWM strategy illustrated by the waveforms of FIGS. 4(a) and 4(b), wherein switches X, Y, Z are maintained ON for a period DT and switches X', Y', Z' are maintained ON during the period (1–D)T, where D is the control input duty ratio which takes a value between zero and unity and T is the switching period (1/F, where F is the chopping or switching frequency). When the switches X, Y, Z are ON (and switches X', Y' and Z' are OFF), the voltages across each of the output inductors are the excess of input voltages over the output voltages of the corresponding phase.

Thus, the voltage across the first inductor in phase 1 is given by VL1=V1–V1o, etc.

When switches X', Y', Z' are ON (and switches X) Y and Z are OFF), the voltage across the output inductor is the inverted output voltage. Thus, the voltage across the first inductor, in phase 1, is given by VL1=–V1o.

Under balanced input and output conditions, if $V_{in}$ and $V_{out}$ are defined to be the RMS value of the input and output line to line voltages, the transfer characteristics of the buck converter may be calculated (using volt-second balance across the inductor) to be $$V_{out}=DV_{in} \tag{1}$$

Thus, since D varies between 0 and 1 the output voltage may be made to be any fraction (less than or equal to unity) of the input voltage.

The following provides variations of the inventive structure, for a one phase implementation for example.

Figure 7:
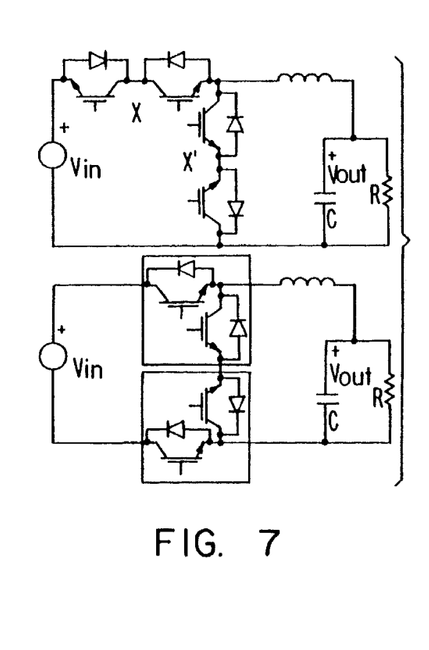
FIG. 7 shows a pair of single phase circuits incorporating the inventive concept.

In accordance with the invention, a single phase buck converter incorporating the above principles and having bidirectional input current and voltage capability is illustrated by the first circuit shown in FIG. 7. The input and output voltage transfer properties still hold. In the second circuit shown in FIG. 7, the circuit is redrawn to highlight a practical implementation thereof, using half-bridge semiconductor modules. As previously noted herein, the switches used in the configurations of FIGS. 3 and 7 may be MOSFETs, IGBTs or any other gate turn-off devices. Snubber devices across each switch, to divert the current flow during switching instances, are not shown in the circuit diagram.

As illustrated in FIG. 7, a single phase implementation of the invention requires 4 real switching devices per phase. However, as illustrated in FIG. 3, the three-phase implementation does not require 4×3=12 active switches, but only 6 such switches, showing a significant structural or topological difference between the inventive three phase converter and the single phase converter.

Figure 8A:
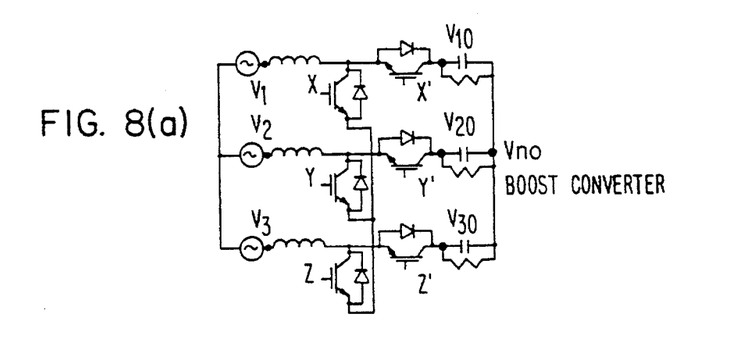
FIGS. 8(a)–8(e) show power circuit topologies of five additional embodiments of the inventive three phase power converter.
Figure 8B:
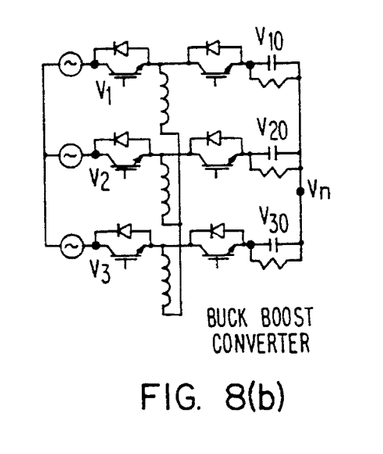
Figure 8C:
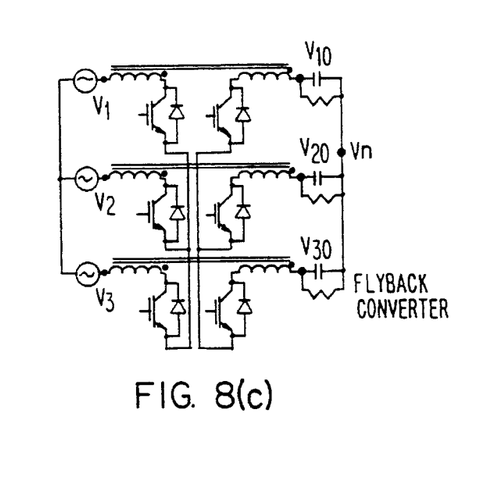
Figure 8D:
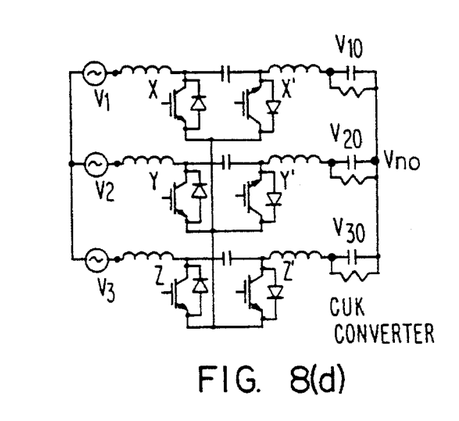
Figure 8E:
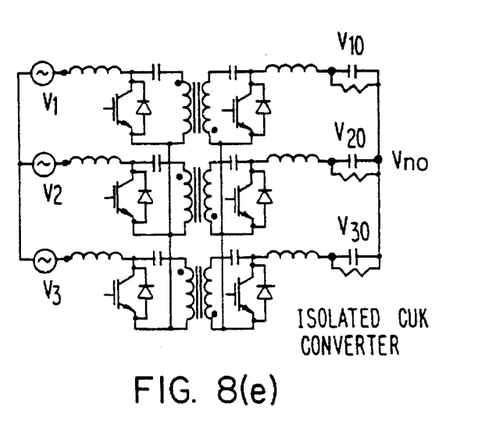

In accordance with the invention, the concepts used to develop the three phase AC buck converter of FIG. 3 may be extended to other converters. FIGS. 8(a)–8(e) show the power circuit topologies of various other three phase power converters. FIG. 8(a) shows a boost converter, FIG. 8(b) shows a buck-boost converter, FIG. 8(c) shows a flyback converter, FIG. 8(d) shows a Cuk converter and FIG. 8(e) shows an Isolated Cuk converter, all incorporating the features of the invention. As previously noted for the embodiment of FIG. 3, snubber circuits, which should be added across each switching device X, Y, Z, X', Y', Z' to divert the current flow during switching instances, are not shown in the circuit diagram.

Table 1 shows the steady state input-output voltage gain of each of these converters as a function of duty ratio.

TABLE 1

Voltage Transfer Ratio for Different Converters
D-Duty ratio, n-transformer turns ratio

| Power Converter | (Output voltage/Input voltage) |
|---|---|
| Buck | D |
| Boost | 1/(1-D) |
| Buck-Boost | D/(1-D) |
| Flyback | nD/(1-D) |
| Cuk | D/(1-D) |
| Isolated Cuk | nD/(1-D) |

It is particularly noted that, for the boost converter of FIG. 8(a) there is provided a three phase power converter for converting three phase ac power, available at a given voltage and a given frequency, to three phase ac power at the same frequency but different voltages. The circuit is functionally equivalent to a variac or an autotransformer, but operates on the above noted principle of high frequency switched mode power conversion. The concept may also be extended to a single phase ac boost converter in the manner previously illustrated for extending the three phase buck converter embodiment of FIG. 3 to the single phase example of FIG. 7. In the embodiment of FIG. 8(a), when the switches X, Y and Z are ON (and X', Y' and Z' are OFF), the voltage across each of the input inductors is equal to the input voltage of the corresponding phase. When the switches X', Y' and Z' are ON (and X, Y and Z are OFF), the voltage across each of the inductors is the excess of input voltage over output voltage in the corresponding phase. Under balanced input and output conditions, if $V_{in}$ and $V_{out}$ are defined to be the rms value of the input and output line to line voltages, the transfer characteristics of the boost converter may be calculated in a known manner, using volt-second balance across the inductors, to be $$V_{out}=V_{in}/(1-D).$$

As D varies between 0 and unity, the output voltage $V_{out}$ is increased from $V_{in}$ to higher values.

Similarly, for the buck-boost converter of FIG. 8(b) there is provided a three phase power converter for converting three phase ac power, available at a given voltage and a given frequency, to three phase ac power at the same frequency but different voltages. The circuit is functionally equivalent to a variac or an autotransformer, but operates on the above noted principle of high frequency switched mode power conversion. The concept may also be extended to a single phase buck-boost ac converter. This embodiment is topologically equivalent to a cascade connection of the buck converter of FIG. 3 and the boost converter of FIG. 8(a), and an analysis thereof may thus be omitted. However, under balanced input and output conditions, if $V_{in}$ and Vout $V_{out}$ are defined to be the rms value of the input and output line to line voltages, the transfer characteristics of the buck-boost converter may be calculated in a known manner, using volt-second balance across the inductors, to be $$V_{out}=V_{in}(D)/(1-D).$$

Similarly, when using isolating transformers in an isolated version of the buck-boost converter, there results a flyback converter shown in FIG. 8(c). A similar analysis results in a transfer characteristic $$V_{out}=V_{in}n(D)/(1-D),$$

where n is the turns ratio for the transformers.

The inventive concept may also be incorporated in the embodiment illustrated in FIG. 8(d). Therein is shown a version of the three phase AC to AC power converter as applied to a topology previously used for a DC-DC converter, known as a Cuk converter. Again, the converter is topologically equivalent to a cascade connection of a boost converter and a buck converter. Under balanced input and output conditions, if $V_{in}$ and Vout $V_{out}$ are defined to be the rms value of the input and output line to line voltages, the transfer characteristics of the converter of FIG. 8(d) may be calculated in a known manner, using volt-second balance across the inductors, to be $$V_{out}=V_{in}(D)/(1-D).$$

Similarly, when using isolating transformers in an isolated version of the converter of FIG. 8(d), there results an isolated Cuk converter as shown in FIG. 8(e). Similarly to the isolated flyback converter of FIG. 8(c), the transfer characteristic is $$V_{out}=V_{in}n(D)/(1-D),$$

where n is the turns ratio for the transformers.

It is noted that the voltage sources illustrated in the embodiments of FIG. 3, FIG. 8(a), FIG. 8(b), FIG. 8(c), FIG. 8(d) and FIG. 8(e) are shown as ideal sources. However, as non-ideal voltage sources are used, filtering may be required. Specifically, although not shown in the figures, a filter capacitor should be used across each of the voltage sources shown in the buck converter shown in FIG. 3. Similarly, a filter capacitor should also be used across each of the voltage sources of the buck-boost converter of FIG. 8(b), and across each of the voltage sources of the flyback converter of FIG. 8(c).

DESIGN CONSIDERATIONS

The above described converters incorporate in an AC-AC converter some of the structural features previously used in DC-DC converters. Accordingly, known analysis methods of PWM DC-DC converters may be directly applied to calculate the output voltage ripple, current ripple and voltage and current stress on components, etc. For example, for a buck converter, output ripple and current ripple, which are shown in FIG. 5, are given by:

$$\Delta V_O/V_P=(1-D)/[8LCF^2] \qquad (2)$$

$$\Delta I_L/I_P=(1-D)R/[LF] \qquad (3)$$

where $\Delta V_0$ is the peak to peak output ripple voltage, $V_P$ is the output peak voltage, $\Delta I_L$ is the peak to peak inductor current ripple, $I_P$ is the peak inductor current, D is the duty ratio, L is the value of filter inductance, R is the load resistance, C is the value of filter capacitance and F is the switching frequency.

The selection of snubber device across individual devices is more critical than the filter elements. Due to safety requirements, the gate drive circuits generally provide a short dead time ($t_d$) between the drive signals of the top and bottom device of semiconductor modules. In addition there is also a delay time ($t_s$) associated with the turn-on of the active devices. Due to bidirectional currents in ac converters, safe and successful commutation requires provision of bypass current paths during these periods. The schematic of such a snubber is shown in FIG. 6.

In the snubber of FIG. 6, there is shown a capacitor $C_s$ which absorbs the energy during the current diversion period and which discharges during the subsequent turn on event. Given the peak inductor current ($I_P$) and the allowed peak voltage ($\Delta V_s$) excursion in the snubber capacitor $C_s$, the capacitance value of the snubber capacitor $C_s$ may be calculated to be $$C_s=I_P(t_d+t_s)/\Delta V_s \qquad (5)$$

The snubber also includes a resistor $R_s$. The value of the resistor $R_s$ may be calculated for a given maximum snubber discharge time $\tau_d$ for the snubber as $$R_s=0.2\tau_d/C_s \qquad (6)$$

The total snubber power loss ($P_s$) for the whole circuit may be calculated as $$P_s=1.5C_s\Delta V_g^2 F \qquad (7)$$

As an example of design of the inventive structure, for a 230 V, 10 kW buck converter using IGBT's switching at 2 kHz with $t_d+t_s=2$ μs, $\tau_d=2$ μs, and having 5% ripple voltage at the output, the value of filter components and snubber elements can be calculated as L=250 μH, C=250 μF, $C_s$=0.3 μF and $R_s$=1.3Ω.

SIMULATION AND EXPERIMENTAL RESULTS

Figure 9:
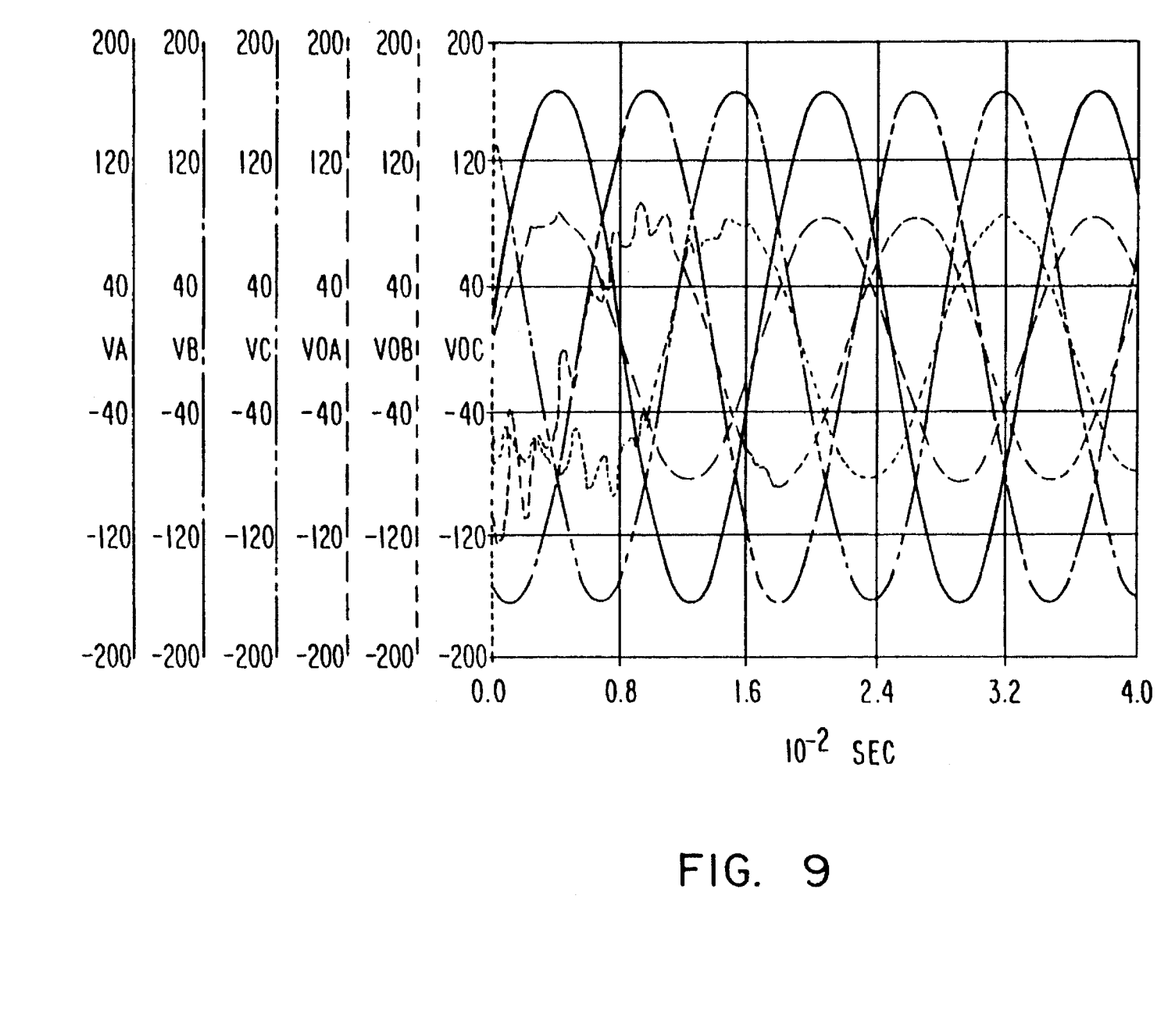
FIG. 9 shows computer simulations of three phase input and output voltage waveforms of the inventive buck converter.
Figure 10A:
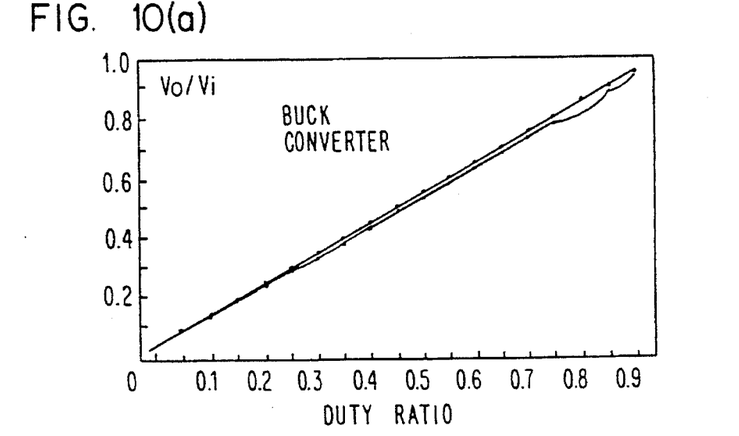
FIGS. 10(a)–10(c) show experimentally obtained transfer characteristics of various of the inventive converters.
Figure 10B:
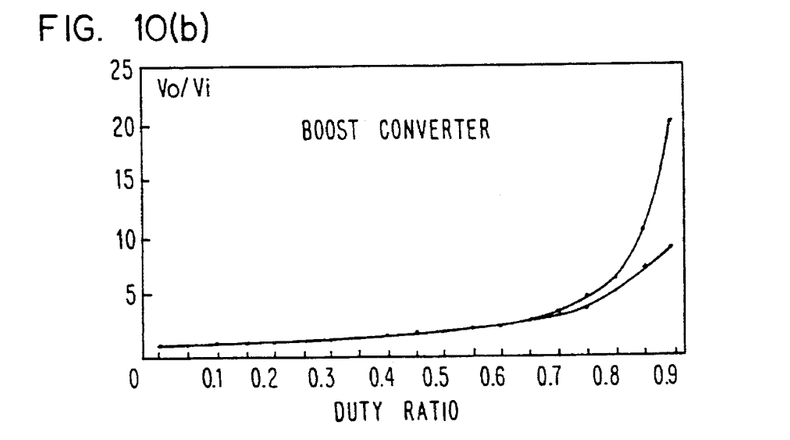
Figure 10C:
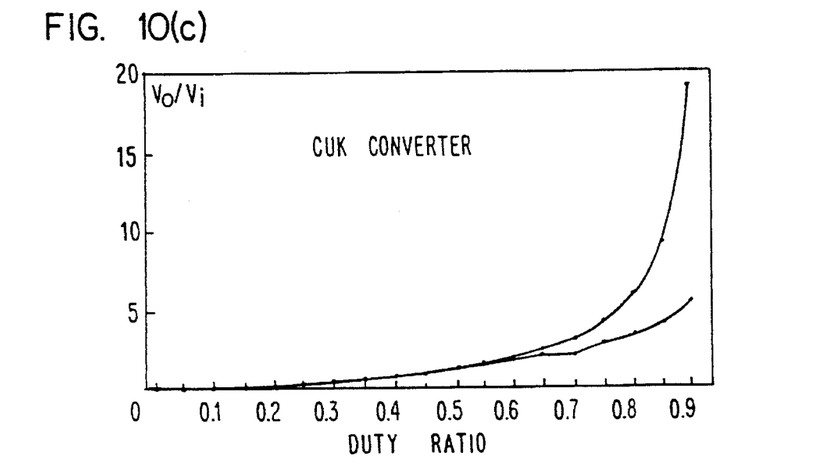

FIG. 9 shows the three phase input and output voltage waveforms of the above example of a buck converter, operating at a duty ratio of 50%, as obtained using computer simulations. Further to the simulations, a laboratory breadboard was built to verify the operation of the converters. FIGS. 10(a)–10(c) show the transfer characteristics of various converters as obtained from laboratory experiments. Both simulation and experimental waveforms confirm the operation of the inventive family of power converters as predicted.

Figure 11:
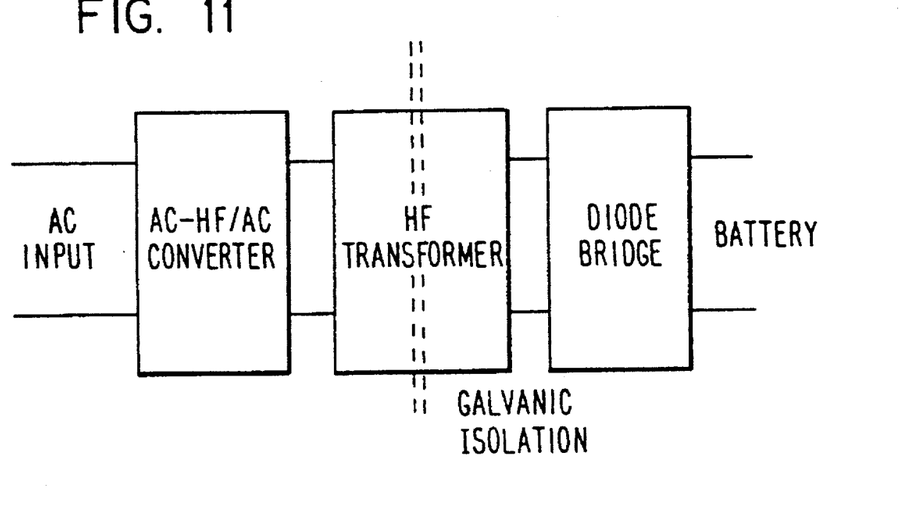
FIG. 11 shows an AC-DC converter according to the invention.

Referring now to FIG. 11, the inventive concept is shown in conjunction with an AC-DC converter, having fewer components and fewer stages than the prior art of FIG. 2(a). Only three stages are used, only one of which is a controlled power converter, as opposed to two such converting stages in the five stage configuration of the prior art shown in FIG. 2(a). Thus, dramatic improvements result in control complexity and reliability, as well as in efficiency of operation.

Advantageously, the intermediate DC bus required by the prior art to filter out 120 Hz fluctuations in power is eliminated, thus reducing the bulk of the system.

Figure 12:
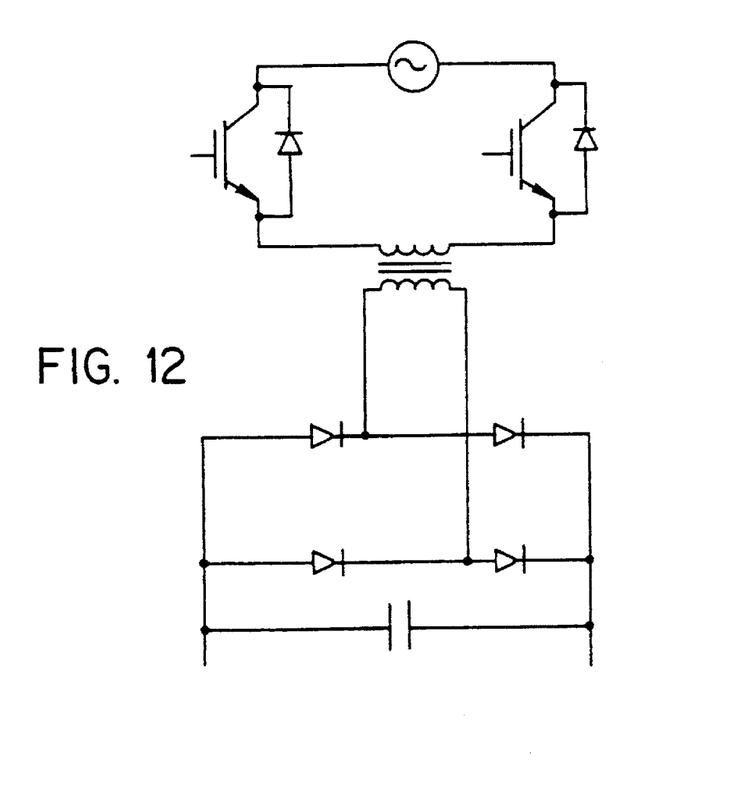
FIG. 12 shows a first specific embodiment of the inventive AC-DC converter of FIG. 11.

In FIG. 12 there is shown a first specific embodiment of the inventive AC-DC converter, a buck-boost version having dramatically simpler topology than the prior art. As seen in the figure, a pair of oppositely poled switching devices are connected in series, for respectively conducting current from the voltage source in opposite directions. The switching devices are pulse-width-modulated gate turn off devices, controlled to be complementarily conducting, and are connected across the input AC voltage source. Such devices may be IGBT's as shown in the figure, or other elements as herein described.

A high frequency isolating transformer is provided, having a primary winding connected in series with the turn off devices, for coupling the output thereof to a rectifier bridge by a secondary winding.

Figure 13:
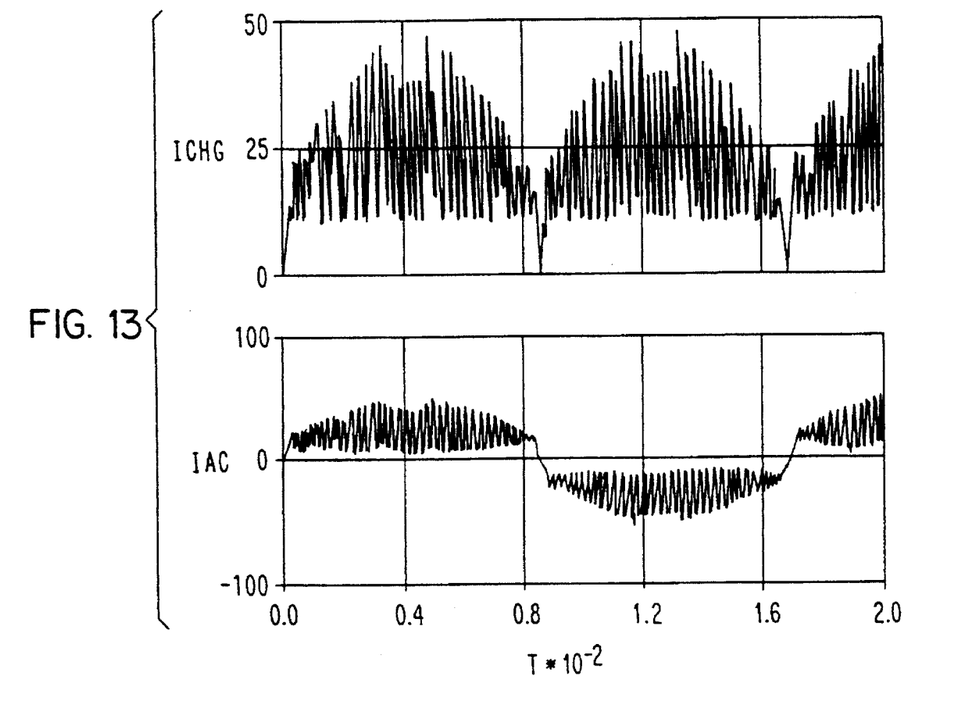
FIG. 13 shows computer simulation of waveforms of the input current and battery charging current for the embodiment of FIG. 12.

Thus, the converter employs only a single energy storage/transfer element, the transformer, providing an elegant, simplified, power converter topology employing a minimum number of components featuring unity power factor operation. Complete primary side control is provided, with high-frequency isolation, and exclusive use of passive elements on the secondary side. Thus, when used in a battery charging environment, the converter is capable of operating over the complete range of battery charge—from a fully discharged to a fully charged state. Computer simulation results of the buck-boost version were obtained, and are shown in FIG. 13, showing the waveforms of the input current and battery charging current when operating at completely discharged and completely charged states of the battery.

Figure 14:
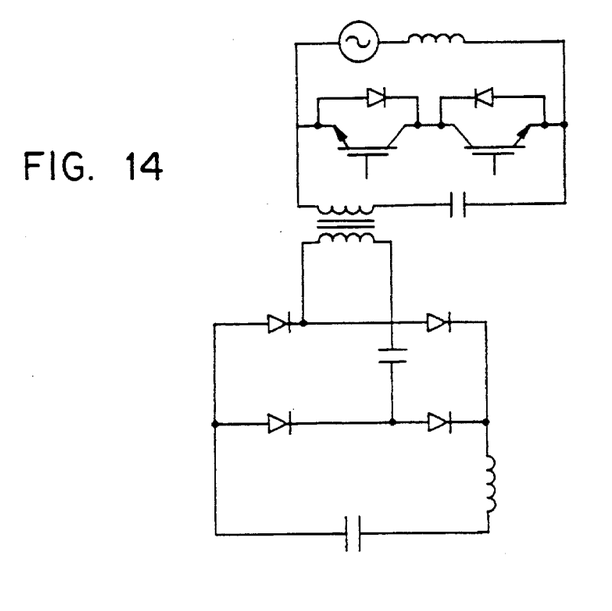
FIG. 14 shows another embodiment of the converter of FIG. 11.

FIG. 14 shows a modified version of the converter of FIG. 11, known as a Cuk converter. As shown therein, an inductor is connected in series with the input voltage source, and the gate turn off devices are connected across the series combination of the voltage source and inductor. a filter capacitor is provided in series with the primary winding of the transformer, and the series combination is connected across the pair of gate turn off devices.

Figure 15:
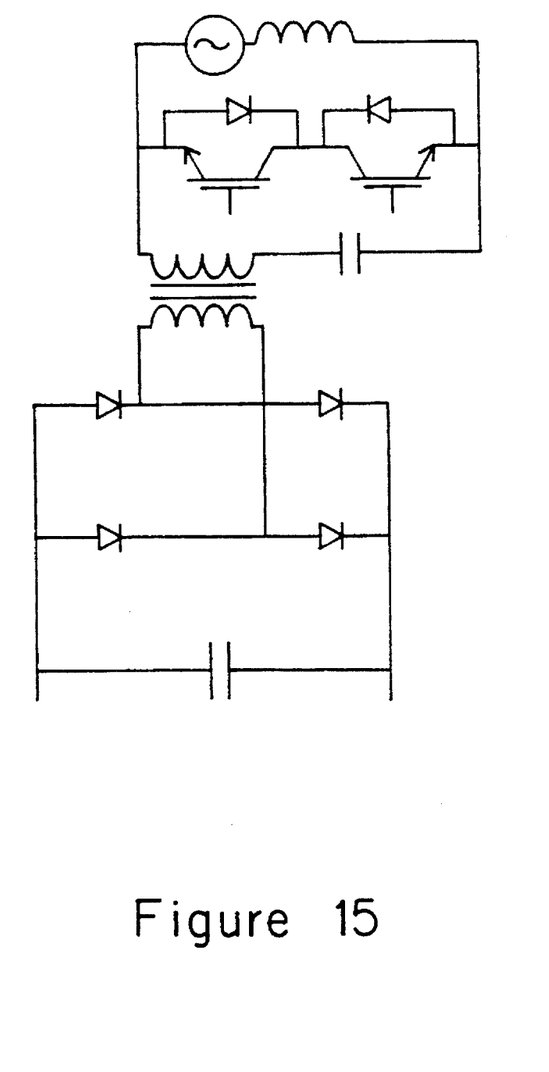
FIG. 15 shows another embodiment of the converter of FIG. 11.

Another embodiment of the converter of FIG. 11, a SEPIC (single ended primary inductor converter) version, is shown in FIG. 15.

In accordance with the invention, there has thus been disclosed a family of three phase AC power converters, featuring sinusoidal input and output voltages, high power factor, bidirectional operation and galvanic isolation, and step up/down voltage control. Operation of the converters has been verified by simulation and experimental results. Applications for the disclosed converters include, inter alia, industrial heating, lighting control, motor control, process control, line conditioning, power system control, laboratory power supplies, power distribution, and reactive power control.

Moreover, there has been described an AC-DC power converter, having simplified structure and improved operation.

The foregoing description of the preferred embodiments of the invention has been presented for purposes of illustration and description. It is not intended to be exhaustive or to limit the invention to the precise forms disclosed, since many modifications or variations thereof are possible in light of the above teaching. For example, various switching devices may be used as the gate turn off devices. As previously noted herein, the terminology is intended to describe generic devices capable of being switched ON and OFF, and may include various structures, such as MOSFETs, IGBTs and the like, and is not limited to known GTO switches.

Still other modifications will occur to those of ordinary skill in the art. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

I claim:

1. Apparatus for converting AC power to DC power, comprising:

pulse-width-modulated switching means connected across an input voltage source providing an input AC voltage, said switching means operating at a frequency higher than a frequency of the input AC voltage, high frequency isolating means receiving an output from said pulse-width-modulated switching means, and rectifying means receiving a high frequency output signal from said high frequency isolating means for converting the output signal to a DC voltage.

2. The apparatus of claim 1 wherein said switching means comprises first and second series connected gate turn off means.

3. The apparatus of claim 2 wherein said first and second series connected gate turn off means are connected in parallel with said input voltage source, and said high frequency isolating means comprises a high frequency transformer, having a primary winding series connected with said gate turn off means and a secondary winding connected to said rectifying means.

4. The apparatus of claim 2, further comprising an inductance connected in series with said input voltage source, wherein said first and second series connected gate turn off means are connected in parallel with said input voltage source and said series connected inductance, and said high frequency isolating means comprises a high frequency transformer, having a primary winding connected in parallel with said gate turn off means and a secondary winding connected to said rectifying means.

5. Apparatus for converting multi phase AC input power to multi phase AC output power, comprising:

a plurality of pulse-width-modulated switching means respectively connected across a corresponding plurality of input voltage sources providing the multi phase AC input power, said switching means operating at a frequency higher than a frequency of the AC input power, and a plurality of loads respectively connected to said plurality of pulse-width-modulated switching means to receive the multi phase AC output power therefrom.

6. The apparatus of claim 5, comprising three input voltage sources, three pulse-width-modulated switching means and three loads, wherein said three input voltage sources are connected in a three phase configuration, said three pulse-width-modulated switching means are connected in a three phase Y configuration across said three input voltage sources, each of said pulse-width-modulated switching means connected between a corresponding voltage source and a second neutral point, and each of said three loads is connected to a corresponding pulse-width-modulated switching means.

7. The apparatus of claim 6, configured as a buck converter wherein each of said pulse-width-modulated switching means comprises a pair of gate turn off devices, connected in a common conduction direction between said corresponding voltage source and said second neutral point, each load being connected between said output neutral point and a junction between said pair of gate turn off devices forming said respective corresponding pulse-width-modulated switching means.

8. The apparatus of claim 6, configured as a boost converter wherein each of said pulse-width-modulated switching means comprises a pair of gate turn off devices, a first gate turn off device of each of said pulse-width-modulated switching means being connected between said corresponding voltage source and said second neutral point and a second device of each of said pulse-width-modulated switching means being connected between the corresponding load and a junction of said first gate turn off device corresponding voltage source.

9. Apparatus for continuously changing a transformation ratio from a multi-phase AC input to a multi-phase AC output, comprising:

magnitude changing means, configured for variably increasing and decreasing a magnitude of a multi-phase AC power within the apparatus, obtained from the multi-phase AC input;

said magnitude changing means comprising switching circuit elements connected directly to the multi-phase AC input and free of an intervening DC link therebetween, said switching circuit elements operating at a variable duty ratio; and means for providing a control signal to operate said switching means at varying duty ratios in order to increase and decrease the magnitude of the multi-phase AC power with the apparatus, thereby increasing and decreasing the transformation ratio for the multi-phase AC output relative to the multi-phase AC input.

10. The apparatus of claim 1, wherein said switching means includes first and second terminals, and the input voltage source includes first and second source terminals, wherein said first and second terminals of said switching means are connected to said first and second source terminals, respectively, said switching means connected by said first and second terminals thereof directly across the input voltage source for receiving said input AC voltage therefrom to perform pulse-width-modulated switching on said input AC voltage.

11. The apparatus of claim 1 wherein said apparatus is free of an intervening DC link therein.

12. The apparatus of claim 5, wherein said plurality of pulse-width-modulated switching means comprises N pulsewidth-modulated switching means connected to N input voltage sources for converting N phase AC input power to N phase AC output power, where N is an integer greater than 1;

wherein said plurality of N pulse-width-modulated switching means in combination comprises, at most, substantially 2N switching devices.

13. The apparatus of claim 12, wherein each of said at most substantially 2N switching devices comprises a bidirectional-current-conducting, unidirectional-voltage-blocking, device.

14. The apparatus of claim 12, wherein each of said at most substantially 2N switching devices comprises a gate-turn off switch.

15. Apparatus for converting AC power to DC power, comprising:

pulse-width-modulated AC to AC switching means having first and second input terminals;

said first and second input terminals of said switching means respectively connected to first and second source terminals of an input voltage source providing an input AC voltage and free of a DC link therebetween, said switching means operating at a frequency higher than a frequency of the input AC voltage, high frequency isolating means receiving an output from said pulse-width-modulated AC to AC switching means, and rectifying means receiving a high frequency output signal from said high frequency isolating means for converting the output signal to a DC voltage.

* * * * *